US012591826B2

(12) United States Patent
Adur et al.

(10) Patent No.: US 12,591,826 B2
(45) Date of Patent: Mar. 31, 2026

(54) SYSTEM FOR CREATING AND MANAGING ENTERPRISE USER WORKFLOWS

(71) Applicant: Omnissa, LLC, Mountain View, CA (US)

(72) Inventors: Anoop Adur, Bangalore (IN); Saurav Choudhuri, Bangalore (IN); Anikethana Narasimha Murthy, Sunnyvale, CA (US); Chandra Divi, Banglaore (IN); Partheeban Kandasamy, Seattle, WA (US)

(73) Assignee: Omnissa, LLC, Mountain View, CA (US)

( * ) Notice: Subject to any disclaimer, the term of this patent is extended or adjusted under 35 U.S.C. 154(b) by 224 days.

(21) Appl. No.: 17/885,609

(22) Filed: Aug. 11, 2022

(65) Prior Publication Data

US 2023/0401504 A1     Dec. 14, 2023

(30) Foreign Application Priority Data

Jun. 9, 2022    (IN) .............................. 202241033082

(51) Int. Cl.
G06Q 10/0631     (2023.01)
G06F 3/04842     (2022.01)
G06Q 10/0633     (2023.01)

(52) U.S. Cl.
CPC ...  G06Q 10/06316 (2013.01); G06F 3/04842 (2013.01); G06Q 10/0633 (2013.01)

(58) Field of Classification Search
None
See application file for complete search history.

(56) References Cited

U.S. PATENT DOCUMENTS

| | | | | |
|---|---|---|---|---|
| 9,426,120 | B1 * | 8/2016 | Kim ....................... | H04W 12/08 |
| 2014/0222493 | A1 * | 8/2014 | Mohan ............. | G06Q 10/06316 |
| | | | | 705/7.26 |
| 2014/0337863 | A1 * | 11/2014 | Rusu .................. | G06Q 10/0633 |
| | | | | 719/318 |
| 2018/0167491 | A1 * | 6/2018 | Roszak ................... | G06F 21/10 |
| 2019/0392617 | A1 * | 12/2019 | Laetham ............ | G06Q 10/0633 |

(Continued)

OTHER PUBLICATIONS

Khare, "E-Mail Assistant—Automation of E-Mail Handling and Management using Robotic Process Automation," Mar. 2022, International Conference on Decision Aid Sciences and Applications, IEEE, pp. 511-516 (Year: 2022).*

*Primary Examiner* — Ivan R Goldberg
(74) *Attorney, Agent, or Firm* — Kim & Stewart LLP

(57)     ABSTRACT

Systems and methods are described herein for creating enterprise workflows for an enterprise user. In an example, a user can access a workflows tool in a management application. The user can select a trigger event from a list of available trigger events. In response to the selection, the workflows tool can display a list of available actions. The user can select an action. The user can also select other enrolled user devices for executing the workflow. The management application can send the selections to a server. The server can send workflow connectors for the selected trigger event and action to the selected user devices. The workflow connections can include instructions for detecting the trigger event and instructions for performing the action. The management application can install the workflow connectors and begin executing the workflow.

17 Claims, 5 Drawing Sheets

(56) References Cited

U.S. PATENT DOCUMENTS

| | | | |
|---|---|---|---|
| 2020/0202273 A1* | 6/2020 | Lehmann | G06Q 10/06316 |
| 2020/0228357 A1* | 7/2020 | Stuntebeck | H04L 12/1831 |
| 2020/0389525 A1* | 12/2020 | Hardy | H04L 63/20 |

* cited by examiner

DISPLAY A WORKFLOWS TOOL IN A GUI OF A MANAGEMENT
APPLICATION ⟋ 210

RECEIVE A SELECTION OF A TRIGGER ⟋ 220

RECEIVE A SELECTION OF AN ACTION ⟋ 230

RECEIVE A SELECTION OF ANOTHER USER
DEVICE ASSOCIATED WITH A USER ⟋ 240

CONFIGURE A WORKFLOW AT THE SELECTED USER DEVICES ⟋ 250

SYSTEM FOR CREATING AND MANAGING ENTERPRISE USER WORKFLOWS

RELATED APPLICATIONS

Benefit is claimed under 35 U.S.C. 119(a)-(d) to Foreign Application Serial No. 202241033082 filed in India entitled "SYSTEM FOR CREATING AND MANAGING ENTERPRISE USER WORKFLOWS", on Jun. 9, 2022, by VMware, Inc., which is herein incorporated in its entirety by reference for all purposes.

BACKGROUND

Employees of enterprise organizations can have numerous tasks to perform throughout a workday. They also often receive large amounts of information and requests from various sources, such as emails, notifications, text messages, and so on. To help employees manage tasks and information, some organizations use automated workflows. Automated workflows can automate tasks based on a trigger event, such as a scheduled time, reception of a notification or email, or a user's location.

Current workflow tools have shortcomings that present problems for enterprises. For example, some workflow tools lack the ability to detect trigger events that are important to enterprise users, and so the needed action must be executed manually by the user. Many workflow tools require integration of third-party software. The third-party software has limited trigger events and actions to choose from, which is due at least in part because third-party software typically is not designed for any particular enterprise. In other words, third-party workflow tools limit their customers to predefine templates that often do not address the specific needs of an individual enterprise. Additionally, enterprises must pay expensive software licensing fees for such software, and the integration process can also be expensive and time consuming.

As a result, a need exists for a customizable workflows tool for enterprise environments.

SUMMARY

Examples described herein include systems and methods for creating enterprise end user workflows. In an example, user devices can be enrolled in a Unified Endpoint Management ("UEM") system, which can be any system that allows an enterprise to manage work-related applications and data on enrolled user devices. The UEM system can manage the enrolled user devices through a management application that is installed on the enrolled user devices. The management application can include, or provide access to, a workflows tool that allows enterprise users to create personalized workflows. A workflow can be a set of processes, including a trigger event and an action, where the action is performed in response to the trigger event occurring.

The workflows tool can include a frontend graphical user interface ("GUI"), where the user can configure a workflow, and backend workflow connectors that can be used to execute the workflow. For example, when a user accesses the workflows tool, the GUI can display trigger events that the user can choose from. When a user selects a trigger event, the GUI can load options based on a template corresponding with the trigger event. Templates can include information about actions, conditions, and filters that can be configured for the corresponding template.

Actions can be any action that should be performed in response to the trigger event occurring. Conditions can be anything that must be verified after the trigger event occurs before performing the designated action. Filters can be parameters that designate what action is performed when the trigger event occurs. When a user selects a trigger event, the workflows tool GUI can display the actions, conditions, and filters from the corresponding template. The user can then personalize the workflow by choosing an action to be performed when the trigger event occurs and adding any conditions or filters.

As an example, the user can select a trigger event for the start of an online meeting scheduled on the user's calendar. If applicable, the GUI can display conditions for the online meeting. For example, the user can configure the workflow so that that the workflow is only triggered for meetings in which the user is the host. The GUI can display a list of available actions, such as notifying the user 15 minutes before the meeting, launching an application for attending the online meeting, opening data files included in the meeting invite, and so on. The user can select one or more actions depending on the trigger event. If the user selects multiple actions, then the user can configure filters that determine which of the multiple actions is performed. For example, the user can select actions for automatically launching the meeting in an application and opening any data files in the meeting invite. The user can then add filters to the data files action so that only data files of a certain type are opened or that data files of a certain type are not opened.

The workflows tool can allow the user to choose a user device for the workflow. For example, a user can enroll multiple user devices in the UEM system. The workflows tool can allow the user to choose which of the user's enrolled devices will execute the workflow. For example, using a laptop, the user can create a workflow to be executed on the user's smartphone and tablet.

The actions can be cross-platform. In other words, the actions available for an enterprise workflow are not restricted to being performed within a single application, such as the management application. For example, a workflow can cause the user device to launch or perform a specific action in a third-party application. This can be made possible by the backend workflow connectors. The workflow connectors can include software scripts and instructions for executing the workflow, such as instructions for detecting a trigger event or performing an action. When the user creates a workflow, the workflow connectors for the selected trigger events and actions can be sent to and installed at the selected user devices. The workflow connectors can be executed by the management application. For example, after installing the workflow connectors, the management application can begin executing instructions in the workflow connector for the trigger event. When a trigger event is detected, the management application can execute instructions in the workflow connector for the corresponding action.

The workflows tool can allow some users to create enterprise workflows for other users in the enterprise. For example, users in the enterprise can be assigned to groups based on their roles in the organization. Group supervisors can have access to a feature in the workflows tool that allows them to create an enterprise workflow for users assigned to their group. The UEM system can send the corresponding workflow connectors to the enrolled user devices of the users in the group for installation.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described herein for creating enterprise workflows for an enterprise user. In an example, a user can access a workflows tool in a management application. The user can select a trigger event from a list of available trigger events. In response to the selection, the workflows tool can display a list of available actions. The user can select an action. The user can also select other enrolled user devices for executing the workflow. The management application can send the selections to a server. The server can send workflow connectors for the selected trigger event and action to the selected user devices. The workflow connections can include instructions for detecting the trigger event and instructions for performing the action. The management application can install the workflow connectors and begin executing the workflow.

Figure 1:
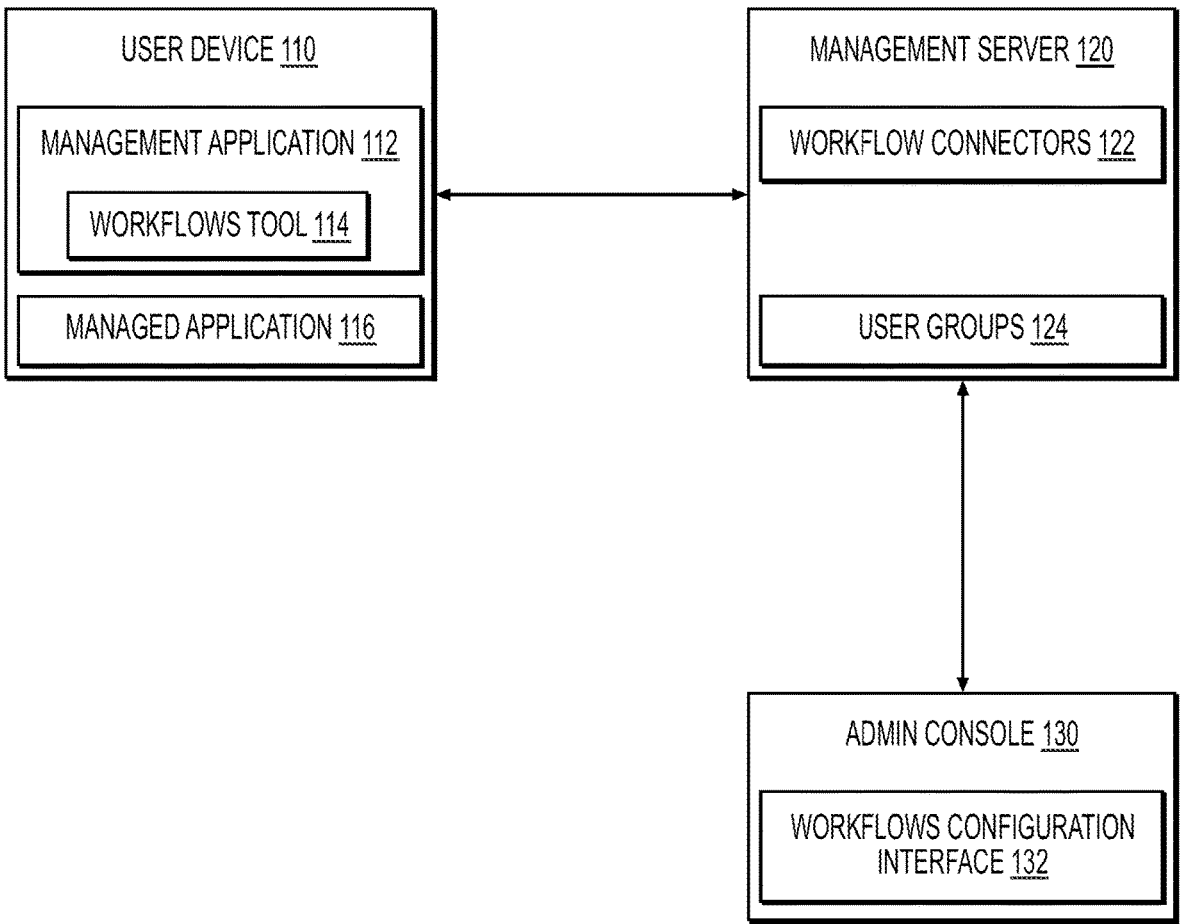
FIG. 1 is an illustration of an example system for creating enterprise user workflows.

FIG. 1 is an illustration of an example system for creating enterprise user workflows. The system can include a user device 110 that is enrolled in a UEM system. User device 110 can be one or more processor-based devices, such as a personal computer, tablet, or cell phone. A UEM system can be any system that allows an enterprise to manage work-related applications and data on enrolled user devices. Users can enroll their own devices, such as cell phones, tablets, or laptops. Enrollment can include installing a management application 112 and other resources on the user device 110.

A management server 120 can be a server that is responsible for managing enrolled user devices in a UEM system. The management server 120 can be a single server or a group of servers, including multiple servers implemented virtually across multiple computing platforms. The management server 120 can manage enrolled user devices, such as the user device 110, by sending management instructions to a management application 112 installed on the user devices. The management application 112 can be a stand-alone application, part of an enterprise application, or part of an operating system of enrolled user devices.

The management application 112 can be downloaded and installed at the user device 110 prior to, or as part of, the enrollment process. For example, a user can download the management application 112 using a URL that points to a content delivery server with an installation file for the management application 112. The URL can be provided by the enterprise, for example. Alternatively, the user can download the management application 112 from an app store, such as APPLE's APP STORE or GOOGLE PLAY. When the user launches the management application 112 for the first time, the management application 112 can prompt the user to enter authentication credentials, such as a username and password or a one-time password ("OTP") provided to the user by the enterprise. The management application 112 can send the user-provided credentials to the management server 120 in an encrypted format.

If the management server 120 can authenticate the credentials, then the management server 120 can begin provisioning the user device 110 for enterprise management. For example, the management server 120 can send a management profile to the management application 112. The management profile can include compliance and security settings assigned to the user's profile and any user groups that the user is assigned to. The management server 120 can also send a security certificate associated with the user's profile that can be used at the user device 120 to access enterprise data and resources, including managed applications like the managed application 116.

The managed application 116 can be an application that allows control of access and functionality by the UEM system. The management server 120 can provision managed applications assigned to the user or the management profile. For example, the management server 120 can provide the management application 112 with installation files or URLs for retrieving the installation files for the managed application 116. The managed application 116 can persist locally on the user device 110 or can be accessed from within the management application 112. Even when the managed application 116 is accessed remotely, portions of the managed application 116 or data utilized by the managed application 116 can exist locally on the user device 110. Local resources can be encrypted and decrypted for use by the management application 112, the managed application 116, or some other process of the UEM system.

The management application 112 can configure the user device 110 using the management profile. For example, the management application 112 can install compliance and security settings from the management profile. As an example, the management application 112 can encrypt all or a portion of the user device's hard drive, apply virtual private network ("VPN") settings for accessing UEM data and resources, and set device access controls (e.g., password or personal identification number ("PIN") requirements). The management application 112 can also install and configure the managed application 116 for the user device 110.

After enrollment is complete, the UEM system can actively manage the user device 110 by sending, via the management server 120 or another server in the UEM system, management commands, including any updated compliance and security settings, to the management application 112. The management application 112 can ensure that the user device 110 is up to date with the compliance and security settings prior to allowing access to enterprise data and resources. For example, the management application 112 can analyze the device state of the user device 110 using rules included in the management profile.

The device state can include various aspects of the user device 110, such as the manufacturer, model, and ID, a current battery charge level, whether the user device 110 is jailbroken, OS type and version, geographic location, a login status of the user, and an identification of the applications installed on the user device 110. The user device 110 can provide periodic updates of its state information to the management server 120. These updates can provide a full list of the various device aspects in one example, but in another example each update can identify changes from the previous device status update.

The management server 120 can send management commands to the management application 112 using any available communication protocol or channel. For example, the management server 120 can send management commands using an application programming interface ("API"), a notification system, a messaging system native to the user device 110, or a command queue. In one example using a command queue, the management server 120 can store one or more commands in a queue that is available to the user device 110 over a network. The commands can encompass any management action, such as instructing the device 110 to download an application, report a device state, or apply a new profile. The management system can alert the user device 110 to a change in the command queue, such as by sending a notification to the device 110 instructing the device to access the command queue. The notification can be sent through the management application 112 in some examples, but can also be sent as an OS-level notification or a message that utilizing an OS messaging scheme, such as a Short Message Service ("SMS") message.

The management application 112 can include a workflows tool 114 that allows a user to create and manage enterprise workflows for the user. An enterprise workflow can be a set of processes, including a trigger event and an action, where the action is performed each time the trigger event occurs. The workflows tool 114 can be part of the management application 112. For example, the workflows tool 114 can be a tab or page in a GUI of the management application 112. The user can access the workflows tool 114 by logging in to the management application 112 with the user's enterprise credentials. Alternatively, the workflows tool 114 can be part of an application separate from the management application 112.

The workflows tool 114 can allow the user to create a workflow by selecting a trigger event (referred to interchangeably as "trigger events" and "triggers") and an action to be performed when the trigger event occurs. The management server 120 can retain, or otherwise have access to, workflow connectors 122 for each trigger/action combination. Workflow connectors 122 can be scripts or executable files that cause the user device 110 to perform a specified operation. Examples of such operations are described in detail later herein. When a user creates a workflow, the management application 112 can retrieve the corresponding workflow connector 122 from the management server 120. Then, when a trigger event occurs, the user device 110 can execute the workflow connector 122 to perform the corresponding action.

The workflows tool 114 can be configured by an admin using a workflows configuration interface 132. The workflows configuration interface 132 can be accessed using an admin console 130, which can be a computer, tablet, or phone that displays the workflows configuration interface 132. Using the workflows configuration interface 132, and admin can configure various aspects of the workflows tool 114. For example, an admin can designate triggers for which a user can create a workflow and which actions are available for each trigger. Such designations can be based on user groups 124. For example, each user can have a user profile in the UEM system, and a user's profile can indicate a group 124 with which the user is associated. The admin can designate triggers and actions by user group 124, and the triggers and actions available to a user can be based on the groups 124 that the user belongs to.

The management application 112 and the admin console 130 can communicate with the management server 120 using any kind of secure communication protocol, such as Hypertext Transfer Protocol Secure ("HTTPS") or an API call.

Figure 2:
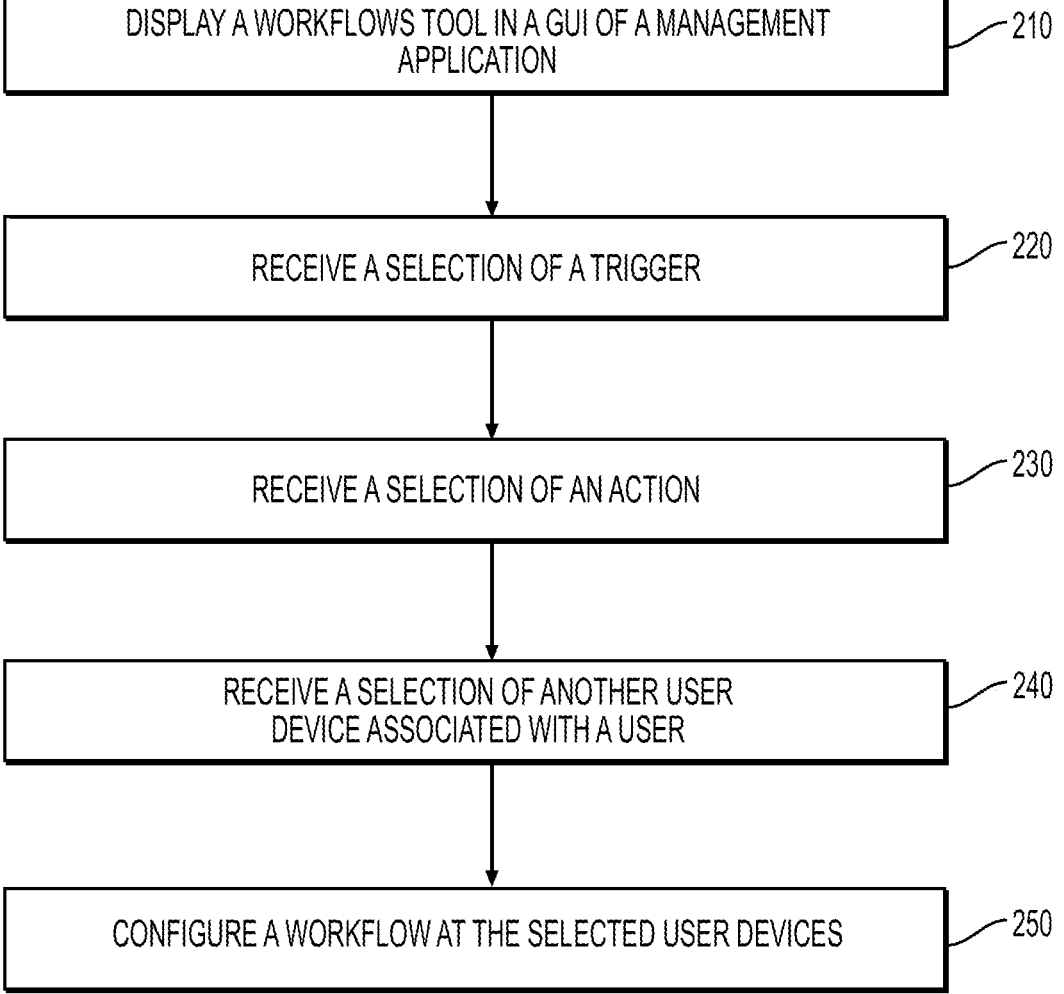
FIG. 2 is a flowchart of an example method for creating enterprise user workflows.

FIG. 2 is a flowchart of an example method for creating enterprise user workflows. At stage 210, the management application 112 can display the workflows tool 114 at the user device 110. As described previously, the workflows tool 114 can include a GUI that allows a user to create and manage enterprise workflows. For example, an enterprise workflow can include a trigger event and an action to perform when the trigger event occurs. A trigger event can be any kind of designated event or occurrence. When the corresponding event occurs, the management application 112 can be triggered to perform the corresponding action. Some examples of trigger events can include arrival or departure from a location, a scheduled time of a particular event or event type, reception of an enterprise notification, and a new product or feature being released.

In one example of the workflows tool 114, a list of trigger events can be displayed in the GUI. The list of trigger events available to the user can depend on various factors. For example, an admin, using the workflows configuration interface 132, can designate trigger events for which a user can create an enterprise workflow. The admin can designate trigger events by user, by user group 124, or both. In one example, the admin can designate trigger events from a list of trigger events that the UEM system is configured to recognize. For example, the workflow connectors 122 can include instructions and rules for determining when a trigger event occurs. Each trigger event can have a corresponding workflow connector 122. Actions associated with a trigger can also have corresponding workflow connectors 122. Workflow connectors 122 for actions can include instructions for performing the action after the trigger event has occurred.

When the user loads the workflows tool 114, the workflows tool can display trigger events that the admin has designated to the user and/or the user's assigned groups 124. The trigger events can be displayed as a list, such as in a drop-down menu. The trigger events can also be displayed in a window that allows the user to select multiple trigger events. The workflows tool 114 can include selectable multi-selection operators that determine how multiple selected trigger events are handled. As an example, the user can select an "AND" multi-selection operator to designate that all of the selected trigger events must occur in order to perform an action. An "OR" multi-selection operator can designate that any of the selected trigger events must occur in order to perform an action.

At stage 220, the management application 112 can receive a selection of a trigger event. For example, the user can select a trigger event from the displayed list. Each trigger event can have one or more associated actions that can be performed when the trigger event occurs. Each trigger can include an associated set of instructions for determining when the trigger event occurs. As an example, if enterprise workflow includes a trigger event based on the user's location, then the management application 112 can retrieve Global Position System ("GPS") information from the user device 110 and determine the user's geo-location. The management application 112 can compare the user's geo-location to rules associated with the trigger to determine when the trigger event occurs. For example, a trigger event can occur if the user's geo-location is within a threshold distance of a location. In an example of such a workflow, a work location, such as an office building, can manage physical access with digital badges on the employee's user devices. A user can create a workflow that causes the management application 112 to enable the user's digital badge when the user device 110 comes within a certain distance of the work location. The user can create another workflow that disables the digital badge when the user leaves the work location.

Trigger events can be based on the occurrence of a date and time. For example, a trigger event can be the scheduled start time of a meeting or a predetermined amount of time before the scheduled start time, such as 5, 10, or 30 minutes beforehand. The management application 112 can have access to the user's enterprise calendar to determine when the trigger events will occur. Time-based trigger events can be based on a set time and date, or day of the week, such as every Monday at 9:00 AM.

Trigger events can be based on the management application 112 receiving certain information. For example, a user can create a workflow where an action is triggered whenever the management application 112 or the user device 110 receives a notification, a managed email application receives a new email, or another user shares digital content with the user. The example trigger events described herein are merely exemplary and not meant to be limiting in any way. For example, a trigger event can be any event that can be detected by the management application 112.

In response to the trigger event selection, the workflows tool 114 can display the potential actions associated with the selected trigger event. For example, each trigger event can be part of a template that includes the trigger event and actions that can be performed responsive to the trigger event occurring. Templates can be created and modified by an admin using the workflows configuration interface 132. The workflows configuration interface 132 can save the templates as data files, such as JavaScript Object Notation ("JSON") or Extensible Markup Language ("XML") files. When a user selects a trigger event, the management application 112 can load the corresponding template and display the available actions for that trigger event.

At stage 230, the management application 112 can receive a selection of an action. In some examples, the user can select multiple actions. For example, the actions can be displayed in a window that allows the user to select multiple actions. When the trigger event occurs, the management application 112 can perform all the selected actions. Some actions can be associated with other applications. As an example, if the trigger event is the scheduled start time of an online video meeting, then the user can select actions for launching a first application for attending online meetings and launching a second application with a data file included in the meeting invite. The applications can be applications provided by the UEM system or third-party applications.

Trigger events related to notifications can have a customized set of available actions that is different from time-based trigger events. For example, a notification-based trigger event can allow a user to mark a notification as read, archive, or delete a notification, forward information from a notification to a communication channel, share a notification with another user or group of users, launch an application, and so on. As an example, a user can create a workflow that deletes notifications after a designated amount of time, such as a day or a week. In another example, a user can create a workflow that automatically launches a trouble ticket in a corresponding application, such as JIRA, when a notification for the trouble ticket is received. Notification-based workflows can be based on notifications received at the operating system ("OS") of the user device 110. For example, the management application 112 can have admin access to the OS on the user device 110, and this can allow the management application 112 to access and modify OS notifications. The workflows tool 114 can also allow the user to customize actions based on a notification type using conditions and filters, which are described in detail regarding FIG. 3 later herein.

Workflows can also be created for generating notifications. For example, a user can create a workflow that causes the user to be notified when a new feature or update on a certain product is released. An admin or supervisor user can create such notification workflows for an entire user group 124. For example, a supervisor in a tech support department can receive notifications when a high priority incident has occurred or when a problem ticket has not been worked on for a predetermined amount of time, such as a day or three days. The supervisor can create a workflow that causes such notifications to be forwarded to users in the tech department that are currently logged in for work.

At stage 240, the management application 112 can receive a selection of another user device associated with the user. For example, a user can have multiple user devices enrolled in the UEM system, such a smart phone, a laptop, and a tablet. The workflows tool 114 can allow a user to apply an enterprise workflow to a specific user device. As an example, using an enrolled smartphone, a user can create an enterprise workflow that causes the user's laptop to launch an application for an online meeting at the scheduled time of the meeting. The workflows tool 114 can allow some users, such as an admin or a manager of a user group 124, to create workflows for users assigned to the group 124. For example, instead of selecting individual user devices, the workflows tool 114 can allow a user to select user groups. The enterprise workflow can be applied to the user devices of all users in the selected groups.

As an example, employees that work at a certain office of an enterprise can be assigned to a group 124 for the office. An admin can create a workflow for the employees that causes their user devices to display an authentication prompt for the digital badge whenever the employees near the office location with the user device. The admin can also create a workflow that causes the employees user devices to disable the digital badge upon leaving the office location. When the admin creates such workflows, the management server 120 can send the workflow connectors 122 to the user devices 110 of the employees assigned to the group 124. The management application 112 on those user devices 110 can then install the workflow connectors 122. At stage 250, the management application 112 can configure a workflow at the selected user device, the workflow including the selected trigger and the selected action. For example, the management application 112 can send the received selections to the management server 120. The management server 120 can retrieve workflow connectors 122 corresponding to the selected trigger event and actions. The management server 120 can then send those workflow connectors 122 to the management applications 112 on the user devices 110 selected by the user. The management applications 112 can then install the workflow connectors 122.

Installing a workflow connector 122 for a trigger event can cause the management application 112 to actively execute instructions for detecting the trigger event. For example, the management application 112 can begin retrieving location data and comparing the location data to a location identified in the trigger event workflow connector 122, the management application 112 can access the user's calendar and monitor an internal clock on the user device 110 according to scheduled meetings for the user, and so on. Installing a workflow connector 122 for an action can include storing a script or executable file in a predetermined location. When a trigger event is detected, the management application 112 can execute the corresponding script or executable file.

Figure 3:
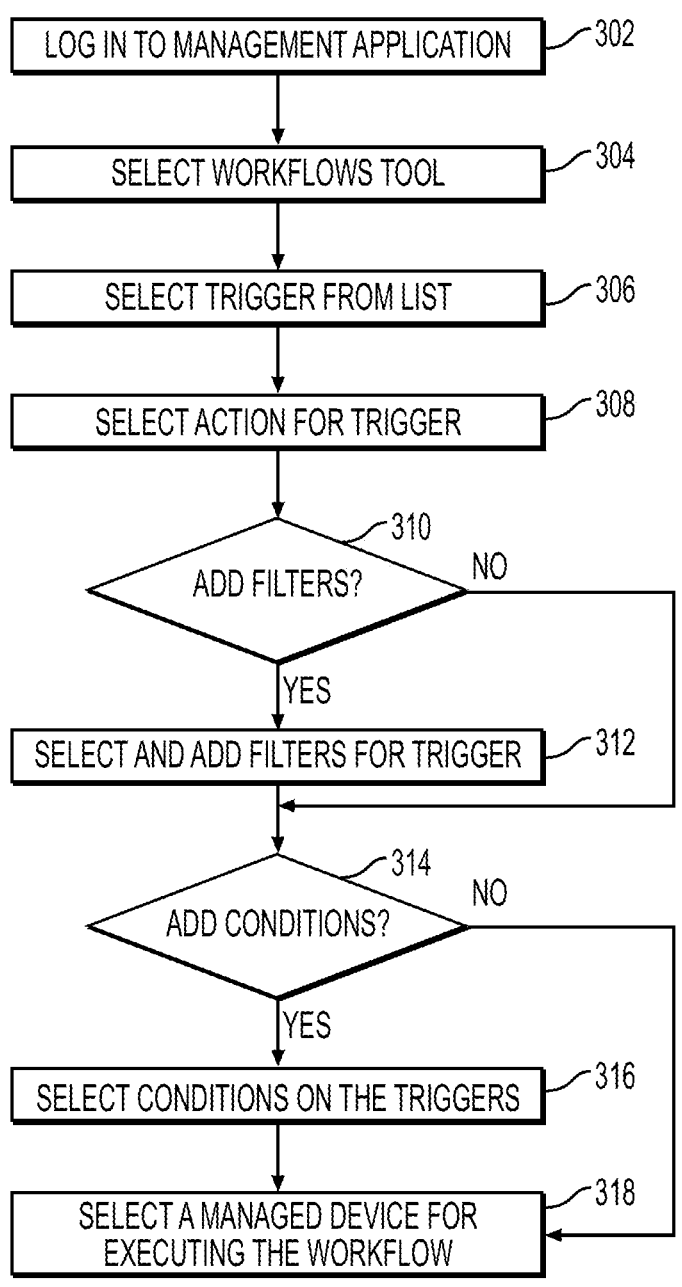
FIG. 3 is another flowchart of an example method for creating enterprise user workflows.

FIG. 3 is another flowchart of an example method for creating enterprise user workflows that includes filters and conditions that a user can add to an enterprise workflow. At stage 302, a user can log in to the management application 112. For example, a user can input credentials, such as a username and password, into a login window of the management application 112. Alternatively, the user's credentials can be provided using a single-sign-on function executed by the management application 112 or another application on the user device 110. The management application 112 can send the credentials to the management server 120 for authentication. If authentication is successful, the management server 120 can notify the management application 112 and the management application 112 can grant the user access.

At stage 304, the user can select the workflows tool 114. For example, the workflows tool 114 can be a page in a GUI of the management application 112. Alternatively, the workflows tool 114 can be a separate application that can be launched by selecting a corresponding icon in the management application 112.

At stage 306, the user can select a trigger from a list of available triggers. For example, the workflows tool 114 can display a list of trigger events that can be used for an enterprise workflow. The displayed trigger events can be predetermined. For example, an admin can designate trigger events for which the user can create an enterprise workflow. The user can select one of the trigger events in the list.

At stage 308, the user can select an action associated with the trigger. For example, in response to the trigger event selection, the workflows tool 114 can display actions associated with the selected trigger event that the user can choose from. In some examples, the workflows tool 114 can allow the user to select multiple actions. When the trigger events occurs, the management application 112 can perform all the actions selected by the user.

At stage 310, the user can optionally add filters to the workflow. Filters can create or enforce parameters that determine what action is performed when the trigger event occurs. For example, an enterprise workflow can include different actions based on various criteria. As an example, some users in an organization can be responsible for approving or declining requests from other users, such as requests for office equipment, downloading applications, and access to certain resources or data. These users can create an enterprise workflow that automatically approves and declines request. For example, if such requests are received as an enterprise notification, a user can set the trigger event as receiving an enterprise notification related to a request. The user can designate one set of filters to an action for approving a request and another set of filters for denying a request. These filters can be based on things like a role of the requestor, a requirement of the requestor, a previous set of approvals in an approval request chain, the type of the request, and so on. As an example, when a management user goes on leave, the management user can create a workflow that automatically approves or denies requests for accessing an application with sensitive information. For example, the workflow can automatically deny requests from users that are not assigned to an approved user group. Alternatively, the workflow can mark such requests as pending manual review. The workflow can be configured to allow requests from users who have previously been approved for access within a certain amount of time, such as within the last month. This type of workflow can prevent backlog and allow users to perform their job responsibilities without having to wait until the management user returns.

The user can also designate an action when no designated actions are satisfied based on the filters. For example, if a request does not meet the criteria for approval or denial, then the management application 112 can display a notification of the request for the user to manually review. If the user selects any filters, then at stage 312 those filters can be added to the enterprise workflow. If the user does not select any filters, then the method can skip stage 312.

At stage 314, the user can optionally add conditions to the workflow. A condition can be anything that the management application 112 must verify before performing the corresponding action of a trigger event. For example, the user can add a condition where an action is triggered only when user is active on the user device 110. As an example, the user can configure an enterprise workflow where the user device 110 launches an application for an online meeting, but with the condition that the user is active on the user device 110. At the scheduled time of an online meeting, the management application 112 can determine whether the user is active before performing the corresponding action. For example, the management application 112 can determine if the user is currently logged in, if user inputs are being received or have recently been received, and so on. If no recent activity from the user is detected, then the management application 112 can ignore the trigger event.

Another condition for an online meeting can be that the user is not currently attending another online meeting. For example, the management application 112 can have access to meeting settings for online meetings, such as the scheduled start and stop time, invitees, whether a meeting is running, and what users are in attendance. Based on the workflow, when the scheduled start time of a meeting arrives, the management application 112 can first determine whether the user is logged in to any other meetings. If so, then the management application 112 can cancel the workflow or delay performing the action until the user leaves the other meeting, depending on how the user configured the workflow.

In another example of a condition, a user can create a workflow for automatically adding shared digital content to the user's profile. The user can add conditions that determines which content is automatically added to the profile. For example, the user can designate specific users or user groups 124 whose shares are automatically added. The user can also add a condition that automatically adds shared content based on the content type, such as web page, notification, or application. The user can also designate key word conditions, such as by automatically adding shared content with the word "technology" in the title.

If the user selects any conditions, then at stage 316 the selected conditions can be added to the workflow. If the user does not select any filters, then the method can skip stage 316.

At stage 318, the user can select another managed user device for executing the workflow. For example, the workflows tool 114 can display user devices that the user has enrolled in the UEM system. In another example, the tool 114 can display user devices of users within a user group 124, such as in an example where a manager of employees within that user group 124 wants to create a workflow for all users within that group 124. The workflow can be added to any user device that the user selects. For example, the management application 112 can create a data file with parameters for the workflow, including the trigger event, actions, filters, and conditions. The management application 112 can send the data file to the management server 120, and the management server 120 can send the data file to the selected user devices. The management application 112 on those user devices can implement the workflows data file, such as by installing the data file.

Figure 4:
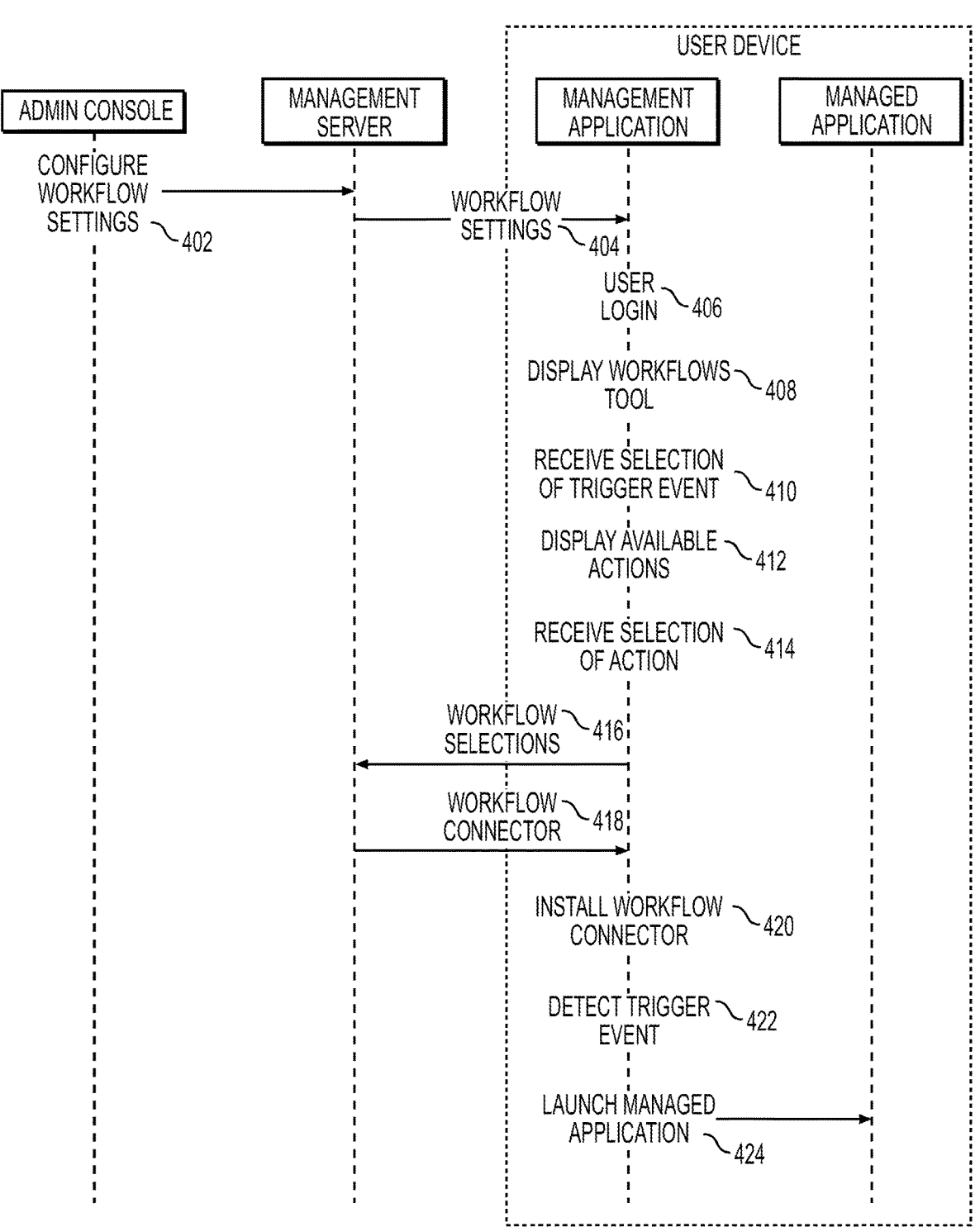
FIG. 4 is a sequence diagram of an example method for creating enterprise user workflows.

FIG. 4 is a sequence diagram of an example method for creating enterprise user workflows that causes the management application 112 to launch a managed application 116. At stage 402, an admin can configure workflow settings at the admin console 130. For example, the workflows configuration interface 132 can give the admin access to a library of preconfigured trigger events and actions, and the admin can enable and disable trigger events and actions for enterprise users. The admin can also configure workflow settings by user group 124. For example, the admin can select a user group 124 in the workflows configuration interface 132 and then enable and disable trigger events and actions for that user group 124.

The admin can also create templates for trigger events. A template can be a data file, such as a JSON or XML file, that includes a trigger event, available actions for the trigger event, and any conditions and filters that can be applied. Some templates can be preconfigured, and the workflows configuration interface 132 can allow the admin to make modifications. For example, the admin can add or remove actions, filters, and conditions.

The admin console 130 can send the workflow settings to the management server 120, and, at stage 404, the management server 120 can send the workflow settings to the management application 112 on the user device 110. The management server 120 can send the workflow settings to the management application 112 using one of various methods. In one example, the management server 120 can push an update file to the management application 112. In another example, the workflows tool 114 can retrieve the workflow settings from the management server 120 when the user logs in to the management application 112. In another example, the workflows tool 114 can be a web application that users access through a web browser or web portal within the management application 112. When a user logs into workflows tool 114 online, the workflow settings corresponding to the user can be loaded on the web page.

At stage 406, a user can log in to the management application 112. For example, a user can input credentials, such as a username and password, into a login window of the management application 112. The management application 112 can send the credentials to the management server 120 for authentication. If authentication is successful, the management server can notify the management application 112 and the management application can grant the user access.

At stage 408, the management application 112 can display the workflows tool 114. For example, the workflows tool 114 can be a page in a GUI of the management application 112. Alternatively, the workflows tool 114 can be a separate application that can be launched by selecting a corresponding icon in the management application 114. The user can select a tab or icon corresponding to the workflows tool 114, which can cause the workflows tool to be displayed at the user device 110.

At stage 410, the user can select a trigger event. The trigger event can be selected from a list of triggers displayed in the workflows tool 114. The trigger events available to the user for creating an enterprise workflow can depend on the workflow settings configured by the admin.

At stage 412, the management application 112 can display available actions based on the selected trigger. For example, the management application 112 can load the template file for the selected trigger event. Loading the template file can cause the management application 112 to display the actions, conditions, and filters for the trigger event.

At stage 414, the user can select an action in the workflows tool 114. In this example method, the user can select an action for launching a managed application 116. For example, the trigger event can relate to a scheduled start time of an online meeting, and the action can be launching a managed application 116 for online meetings, such as ZOOM or MICROSOFT TEAMS. The workflows tool 114 can allow the user to select multiple actions for some trigger events. For example, online meeting invites can include data files with content related to the meeting. The user can configure the workflow so that such data files are opened on the user device 110.

At stage 416, the management application 112 can send the workflow selections to the management server 120. For example, the management application 112 can create a workflow data file based on the trigger template file and send the workflow data file to the management server 120. The management application 112 can send the workflow data file using any available communication protocol, such as HTTPS or an API call.

At stage 418, the management server 120 can send a workflow connector 122 for the selected trigger and action to the management application 112. For example, trigger events and actions can be mapped to their corresponding workflow connectors 122. The mappings can be stored using any format, such as a data table. The management server 120 can use the mappings to identify and retrieve the corresponding workflow connectors 122. If the workflow connectors 122 are retained locally at the management server 120, then the management server 120 can send those workflow connectors 122 to the management application 112. If the workflow connectors 122 are retained at another device, such as a database, then the management server 120 can retrieve the workflow connectors 122 from the database. Alternatively, the management application 112 can request the workflow connectors 122 directly from the data.

At stage 420, the management application 112 can install the workflow connectors 122. The way in which a workflow connector 122 is installed can vary. As an example, some trigger events can relate the location of the user device 110. For such trigger events, the management application 112 can use a workflow connector 122 to configure itself to periodically request GPS data from the OS of the user device 110 and compare the GPS data to the location designated in the workflow. Some trigger events can be based a particular time, such as the scheduled start time of a meeting. For such trigger events, the management application 112 can have access to a clock feature on the user device 110 or the management application 112 can receive time information from the management server 120. At the date and time of the trigger event, the management application 112 can perform the corresponding action. Some trigger events can be based on notifications received at the management application 112. If, for example, the user has designated filters in a workflow related to notifications, the management application 112 can apply the filters whenever a notification is received at the management application 112. This can allow an enterprise workflow to be applied to some notifications and not others.

The management application 112 can also store instructions for performing the corresponding action. For example, the actions can be stored as scripts in a particular folder on the user device 110. When the trigger event is detected, the management application 112 can execute the corresponding script. As an example, running an action script can cause the management application 112 to enable or disable a digital badge, archive a notification, or launch an application.

At stage 422, the management application 112 can detect that the trigger event has occurred. The management application 112 can detect the trigger event based on the instructions in the workflow connector 122. For example, the management application 112 can detect when a scheduled start time of a meeting has arrived, when a notification has been received that satisfies filter criteria, or when the user device 110 has entered or left a predetermined area or location.

At stage 424, the management application 112 can launch the managed application 116. For example, at or around the scheduled start time of a meeting, the management application 112 execute a script that causes it to launch the meeting in a corresponding application. This can include, as an example, launching a managed web browser, or a new tab or window in the web browser, and sending an HTTPS request with a uniform resource locator ("URL") to the online meeting. The management application 112 can also launch managed applications 116 corresponding to data files in the meeting invite. For example, the management application 112 can launch MICROSOFT WORD or GOOGLE DOCS for a text document, ADOBE ACROBAT for a Portable Document Format ("PDF") file, and so on.

Figure 5:
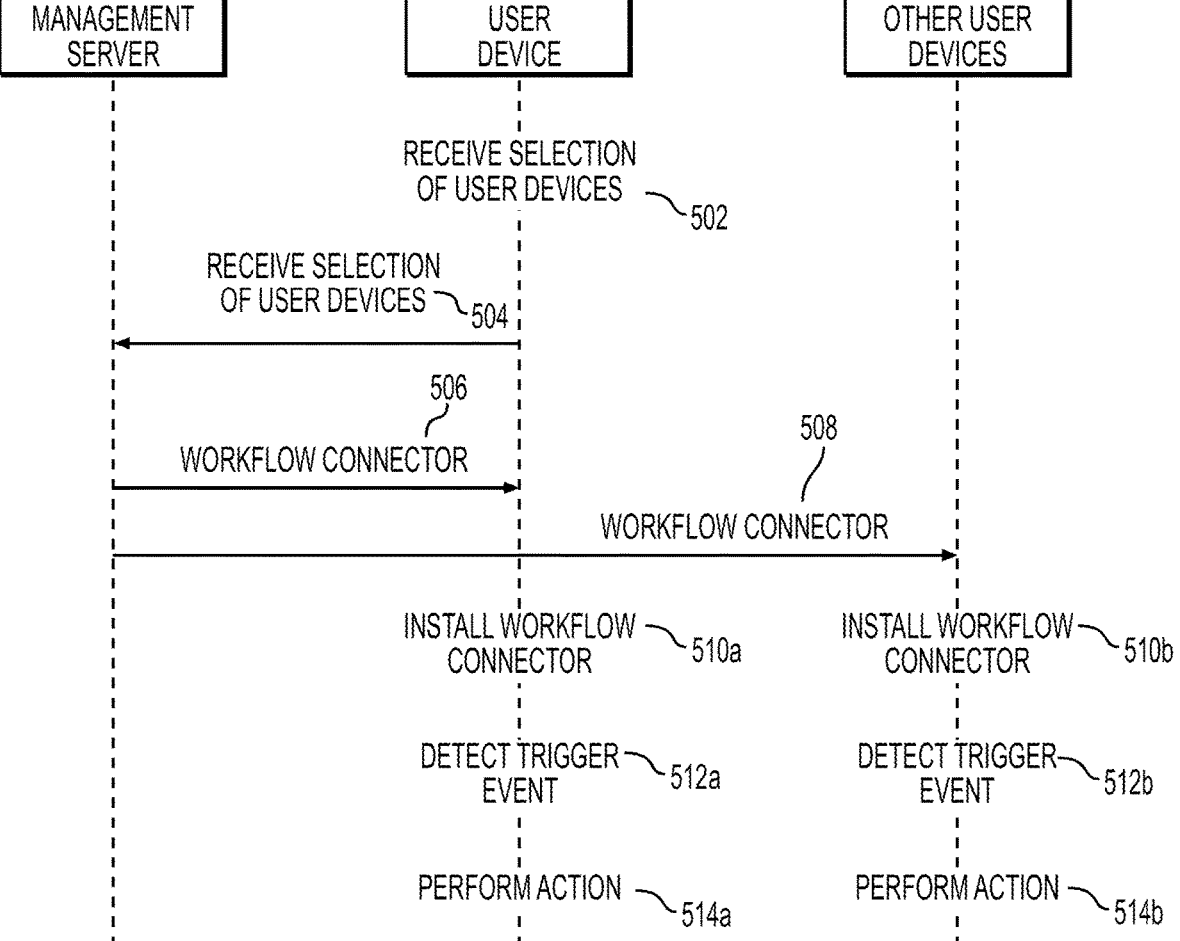
FIG. 5 is a sequence diagram of another example method for creating enterprise user workflows.

FIG. 5 is a sequence diagram of another example method for creating enterprise user workflows where the user can create a workflow for other user devices. The example method below can incorporate some stages of FIG. 4. For example, the method below can begin after stage 414 of FIG. 4. In other words, prior to stage 502, the user can have already selected a trigger event and action for the workflow.

At stage 502, the user can select other user devices associated with the user. The other user devices can be user devices that the user has also enrolled in the UEM system. For example, the user device 110 can be a laptop computer of the user. In another example, the other user devices can be devices belonging to other users, such as in an example where a manager user creates a workflow to be distributed to multiple employees that the manager supervises. The user can create the enterprise workflow on the laptop computer and designate a smartphone or tablet, or another user's device(s), for executing the workflow. Enrolled user devices can be added or removed from workflows during the creation of the workflow or any time thereafter using the workflows tool 114. The workflows tool 114 can display the user's other enrolled devices, and the user can simply select or unselect to respectively add or remove a user device from the workflow. The workflows tool 114 can also display other user's devices for which a user is authorized to create and deliver a workflow.

At stage 504, the user device 110 can send the workflow selections to the management server 120. For example, the management application 112 can create a workflow data file based on a trigger template file and send the workflow data file to the management server 120. The management application 112 can send the workflow data file using any available communication protocol, such as HTTPS or an API call. The workflow data file can identify the user devices designated by the user.

At stage 506, the management server 120 can send a workflow connector 122 for the selected trigger and action to the user device 110. For example, trigger events and actions can be mapped to their corresponding workflow connectors 122. The mappings can be stored using any format, such as a data table. The management server 120 can use the mappings to identify and retrieve the corresponding workflow connectors 122. If the workflow connectors 122 are retained locally at the management server 120, then the management server 120 can send those workflow connectors 122 to the management application 112. If the workflow connectors 122 are retained at another device, such as a database, then the management server 120 can retrieve the workflow connectors 122 from the database. Alternatively, the management application 112 can request the workflow connectors 122 directly from the database.

At stage 508, the management server 120 can send the workflow connector 122 for the selected trigger and action to the selected managed user devices. The management server 120 can do this in the same manner as stage 506 above. For example, the management server 120 can retrieve and send the corresponding workflow connectors 122 to the user devices designated by the user.

At stage 510a, the user device 110 can install the workflow connectors 122. Like stage 420 of FIG. 4, the way in which a workflow connector 122 is installed can depend on the trigger type. Installing the workflow connectors 122 can include configuring the management application 112 to detect when the trigger event occurs. Installing the workflow connectors 122 can also include storing instructions for performing the action. For example, the actions can be stored as scripts in a particular folder on the user device 110. When the trigger event is detected, the management application 112 can execute the corresponding script. In the same or similar manner, at stage 510b, the other user devices can install the workflow connector 122.

At stages 512a and 512b, the management application 112 on the user devices can detect that the trigger event has occurred. The management application 112 can detect the trigger event based on the instructions in the workflow connector 122. For example, the user devices can detect when the scheduled start time of a meeting has arrived or when a notification of a specified type is received. At stages 514a and 514b, the user device 110 and other user devices can perform the action.

Some trigger events may not be detected by all user devices added to the workflow. For example, if the trigger event relates to detecting when the user arrives at or leaves a location, then only the user devices that the user has with him and have access to the user's location will detect the trigger event. In some examples, the workflow can be configured so that only user devices that detect the trigger event perform the corresponding action. As an example, a user can have two smartphones with digital badges that give the user access to a secure location. The workflow can enable a digital badge when the user is near the location. For security reasons, if one of the smartphones nears the location but not the other, then only the smartphone that nears the location will enable the digital badge.

In other examples, the workflow can be configured so that a user device will notify the users other user devices added to the workflow when the user device detects the trigger event. As an example, the user can have a designated primary device, such as the user's smartphone because the user will usually have the smartphone with him. The user can create a workflow that causes his other user devices to log out when the user leaves a location. The user's smartphone can detect when the user leaves the location and notify the management server 120, and the management server 120 can notify the other user devices added to the workflow. Any of the user devices that the user has not logged out of can then proceed to log the user out. This can help prevent unauthorized access to enterprise data and systems caused by a user forgetting to log out of a device.

The user can have the option to not add the user device 110 used to create the workflow to the workflow. As an example, using a laptop computer, the user can create an enterprise workflow for the user's smartphone and tablet but not for the laptop. In such an example, stages 506, 510*a*, 512*a*, and 514*a* can be skipped.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for creating enterprise workflows for a user, comprising:

as part of an enrollment of a first user device of the user for management by a management server, downloading a management application from the management server and installing the management application on the first user device;

displaying, at the first user device, a workflows tool for creating workflows, wherein the workflows tool is displayed in a graphical user interface ("GUI") of the management application;

receiving, on the first user device, a selection of a trigger event that specifies a geographic location, wherein the trigger event is determined to occur when the first user device is within a threshold distance of the geographic location;

receiving, on the first user device, a selection of a plurality of actions including an action associated with the trigger event;

receiving, on the first user device, a selection of a trigger event condition, the trigger event condition identifying a condition that must be verified after the trigger event is detected in order to execute the action;

receiving, on the first user device, a selection of a filter, the filter designating which action to execute of the plurality of actions;

sending, to the management server, the selections of the trigger event, the trigger event condition, the filter and the action;

receiving, by the management application on the first user device from the management server, a first workflow connector corresponding to the selected trigger event and a second workflow connector corresponding to the action, wherein the first workflow connector includes instructions for detecting the trigger event and applying the condition and the second workflow connector includes instructions for applying the filter and executing the action;

installing the first and second workflow connectors on the first user device by the management application, wherein installing the first workflow connector on the first user device includes configuring the first workflow connector to periodically request global positioning system (GPS) data from an operating system of the first user device and evaluate the GPS data against the geographic location specified in the trigger event;

executing the instructions of the first workflow connector on the first user device for detecting the trigger event, wherein executing the instructions of the first workflow connector includes periodically retrieving the GPS data from the operating system of the first user device and evaluating the retrieved GPS data against the geographic location specified in the trigger event; and in response to detecting the trigger event when the retrieved GPS data of the first user device indicates that the first user device is within a predefined threshold distance of the geographic location specified in the trigger event, executing the instructions of the second workflow connector on the first user device to execute the action.

2. The method of claim 1, further comprising:

receiving a selection of a second user device associated with the user; and sending, to the management server, the selection of the second user device, wherein the management server sends the first and second workflow connectors to the second user device for installation.

3. The method of claim 1, wherein executing the action includes launching a third-party application.

4. The method of claim 1, wherein the trigger event is selected from a list of available trigger events displayed in the GUI, and the list of available trigger events displayed is based on a user group that the user belongs to.

5. The method of claim 1, further comprising:

receiving a selection of a user group; and sending the selection of the user group to the management server, wherein the management server sends the first and second workflow connectors to user devices of users assigned to the user group.

6. A non-transitory, computer-readable medium containing instructions that, when executed by a hardware-based processor, causes the processor to perform stages for creating enterprise workflows for a user, the stages comprising:

as part of an enrollment of a first user device of the user for management by a management server, downloading a management application from the management server and installing the management application on the first user device;

displaying, at the first user device, a workflows tool for creating workflows, wherein the workflows tool is displayed in a graphical user interface ("GUI") of the management application;

receiving, on the first user device, a selection of a trigger event that specifies a geographic location, wherein the trigger event is determined to occur when the first user device is within a threshold distance of the geographic location;

receiving, on the first user device, a selection of a plurality of actions including an action associated with the trigger event;

receiving, on the first user device, a selection of a trigger event condition, the trigger event condition identifying a condition that must be verified after the trigger event is detected in order to execute the action;

receiving, on the first user device, a selection of a filter, the filter designating which action to execute of the plurality of actions;

sending, to the management server, the selections of the trigger event, the trigger event condition, the filter and the action;

receiving, by the management application on the first user device from the management server, a first workflow connector corresponding to the selected trigger event and a second workflow connector corresponding to the action, wherein the first workflow connector includes instructions for detecting the trigger event and applying the condition and the second workflow connector includes instructions for applying the filter and executing the action;

installing the first and second workflow connectors on the first user device by the management application, wherein installing the first workflow connector on the first user device includes configuring the first workflow connector to periodically request global positioning system (GPS) data from an operating system of the first user device and evaluate the GPS data against the geographic location specified in the trigger event;

executing the instructions of the first workflow connector on the first user device for detecting the trigger event, wherein executing the instructions of the first workflow connector includes periodically retrieving the GPS data from the operating system of the first user device and evaluating the retrieved GPS data against the geographic location specified in the trigger event; and in response to detecting the trigger event when the retrieved GPS data of the first user device indicates that the first user device is within a predefined threshold distance of the geographic location specified in the trigger event, executing the instructions of the second workflow connector on the first user device to execute the action.

7. The non-transitory, computer-readable medium of claim 6, the stages further comprising:

receiving a selection of a second user device associated with the user; and sending, to the management server, the selection of the second user device, wherein the management server sends the first and second workflow connectors to the second user device for installation.

8. The method of claim 1, wherein the action is a script that causes a digital badge to be enabled or disabled on the first user device.

9. The method of claim 2, further comprising:

in response to detecting the trigger event when the retrieved GPS data of the first user device indicates that the first user device is within a predefined threshold distance of the geographic location specified in the trigger event, sending a notification by the first user device to the management server indicating that the first user device is within the predefined threshold distance of the geographic location, wherein the management server, in response to receiving the notification, sends an instruction to the second user device to log out the user of the second user device.

10. The non-transitory, computer-readable medium of claim 6, wherein executing the action includes launching a third-party application.

11. The non-transitory, computer-readable medium of claim 6, wherein the trigger event is selected from a list of available trigger events displayed in the GUI, and the list of available trigger events displayed is based on a user group that the user belongs to.

12. The non-transitory, computer-readable medium of claim 6, the stages further comprising:

receiving a selection of a user group; and sending the selection of the user group to the management server, wherein the management server sends the first and second workflow connectors to user devices of users assigned to the user group.

13. A system for creating enterprise workflows for a user, comprising:

a memory storage including a non-transitory, computer-readable medium comprising instructions; and a hardware-based processor that executes the instructions to carry out stages comprising:

as part of an enrollment of a first user device of the user for management by a management server, downloading a management application from the management server and installing the management application on the first user device;

displaying, at the first user device, a workflows tool for creating workflows, wherein the workflows tool is displayed in a graphical user interface ("GUI") of the management application;

receiving, on the first user device, a selection of a trigger event that specifies a geographic location, wherein the trigger event is determined to occur when the first user device is within a threshold distance of the geographic location;

receiving, on the first user device, a selection of a plurality of actions including an action associated with the trigger event;

receiving, on the first user device, a selection of a trigger event condition, the trigger event condition identifying a condition that must be verified after the trigger event is detected in order to execute the action;

receiving, on the first user device, a selection of a filter, the filter designating which action to execute of the plurality of actions;

sending, to the management server, the selections of the trigger event, the trigger event condition, the filter and the action;

receiving, by the management application on the first user device from the management server, a first workflow connector corresponding to the selected trigger event and a second workflow connector corresponding to the action, wherein the first workflow connector includes instructions for detecting the trigger event and applying the condition and the second workflow connector includes instructions for applying the filter and executing the action;

installing the first and second workflow connectors on the first user device by the management application, wherein installing the first workflow connector on the first user device includes configuring the first workflow connector to periodically request global positioning system (GPS) data from an operating system of the first user device and evaluate the GPS data against the geographic location specified in the trigger event;

executing the instructions of the first workflow connector on the first user device for detecting the trigger event, wherein executing the instructions of the first workflow connector includes periodically retrieving the GPS data from the operating system of the first user device and evaluating the retrieved GPS data against the geographic location specified in the trigger event; and in response to detecting the trigger event when the retrieved GPS data of the first user device indicates that the first user device is within a predefined threshold distance of the geographic location specified in the trigger event, executing the instructions of the second workflow connector on the first user device to execute the action.

14. The system of claim 13, the stages further comprising:

receiving a selection of a second user device associated with the user; and sending, to the management server, the selection of the second user device, wherein the management server sends the first and second workflow connectors to the second user device for installation.

15. The system of claim 13, wherein executing the action includes launching a third-party application.

16. The system of claim 13, wherein the trigger event is selected from a list of available trigger events displayed in the GUI, and the list of available trigger events displayed is based on a user group that the user belongs to.

17. The system of claim 13, the stages further comprising:

receiving a selection of a user group; and sending the selection of the user group to the management server, wherein the management server sends the first and second workflow connectors to user devices of users assigned to the user group.

\* \* \* \* \*